United States Patent
Cross et al.

(10) Patent No.: US 7,446,488 B1
(45) Date of Patent: Nov. 4, 2008

(54) METAL HALIDE LAMP BALLAST CONTROLLED BY REMOTE ENABLE SWITCHED BIAS SUPPLY

(75) Inventors: John Cross, Needham, MA (US); Walter Batz, Sindelsdorf (DE); Torsten Kuske, Holzkirchen (DE); Bernhard Ertl, München (DE)

(73) Assignee: Osram Sylvania, Danvers, MA (US)

( * ) Notice: Subject to any disclaimer, the term of this patent is extended or adjusted under 35 U.S.C. 154(b) by 0 days.

(21) Appl. No.: 11/847,004

(22) Filed: Aug. 29, 2007

(51) Int. Cl.
*G05F 1/00* (2006.01)
(52) U.S. Cl. .................. 315/308; 315/307; 315/209 R; 315/291; 315/224; 315/82
(58) Field of Classification Search .................. 315/77, 315/82, 83, 209 R, 291, 247, 224, 289, 307–309, 315/DIG. 5; 307/10.8; 361/93.2
See application file for complete search history.

(56) References Cited

U.S. PATENT DOCUMENTS

| | | | |
|---|---|---|---|
| 5,854,538 A | 12/1998 | Krummel | |
| 6,140,771 A | 10/2000 | Luger et al. | |
| 6,323,600 B1 | 11/2001 | Statnic et al. | |
| 6,366,031 B2 | 4/2002 | Klien | |
| 6,411,040 B1 | 6/2002 | Ertl et al. | |
| 6,587,573 B1 * | 7/2003 | Stam et al. | 382/104 |
| 6,836,081 B2 * | 12/2004 | Swanson et al. | 315/307 |
| 6,972,531 B2 | 12/2005 | Krummel | |
| 7,019,466 B2 | 3/2006 | Batz | |
| 7,057,356 B2 | 6/2006 | Johnsen et al. | |
| 7,187,132 B2 | 3/2007 | Bakre | |
| 7,211,965 B2 | 5/2007 | Johnsen et al. | |
| 2006/0290209 A1 | 12/2006 | Bouchard et al. | |

\* cited by examiner

*Primary Examiner*—Haissa Philogene
(74) *Attorney, Agent, or Firm*—Carlo S. Bessone

(57) ABSTRACT

A vehicle lighting system receives power from a power supply and includes a lighting control module, a lamp, and a ballast having a bias control circuit. The lighting control module provides a remote enable signal to the ballast in response to an input. The bias control circuit of the ballast receives a supply voltage from a power supply and the remote enable signal and selectively energizes a bias regulator circuit of the ballast as a function of the remote enable signal. When the bias regulator circuit is energized, a controller of the ballast operates the ballast to provide power from the power supply to the lamp.

31 Claims, 4 Drawing Sheets

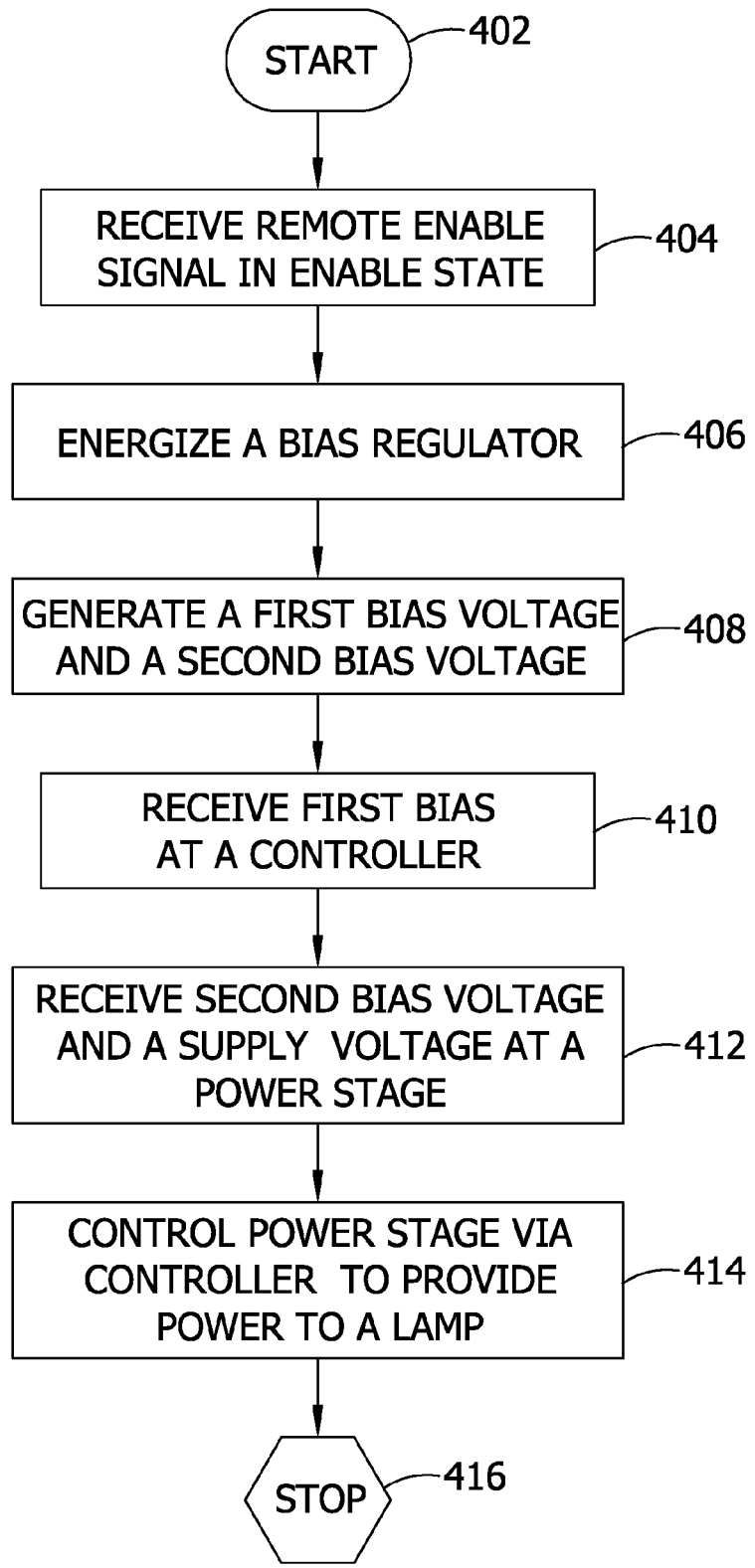

METAL HALIDE LAMP BALLAST CONTROLLED BY REMOTE ENABLE SWITCHED BIAS SUPPLY

BACKGROUND

Metal halide lamps are preferred over halogen lamps in vehicle lighting systems (e.g., automotive headlight systems) because they emit more visible light per watt and have a longer life expectancy. Metal halide lamps can also be designed to emit visible light with a frequency profile similar to sunlight which improves visibility for a given amount of light. However, unlike halogen lamps, metal halide lamps cannot be driven directly from a vehicle power supply (i.e., a vehicle's charging system) and require the use of a ballast. The ballast, strikes the lamp, and adjusts the frequency and current applied to the lamp such that the lamp emits light of the proper intensity to achieve its design life.

Electronic ballasts include a controller which controls operation of a power stage for driving the metal halide lamp. The controller can be placed in a sleep state such that the ballast does not power the lamp which allows a low power switch or electronic signal (e.g. a signal provided by a vehicle's electronic control module) to turn the lamp on and off. However, in the sleep state a relatively simple and inexpensive bias circuit which provides bias power to the controller draws a current large enough to drain the power supply of the vehicle over a relatively short period of time. For example, an electronic ballast with the controller in the sleep state can drain an automobile's battery over a weekend such that the vehicle's owner could not start the car at the beginning of the week without providing additional power to the battery. A bias circuit and controller (e.g., microcontroller) which reduce this sleep state bias power drain to an acceptable level can be designed into the electronic ballast, but are relatively complex and expensive.

Generally, there are three types of lighting control modules used in vehicles that may be used to control an electronic ballast. The first type is a relatively bulky and expensive high power switch, actuated by the vehicle operator, which provides power directly from the vehicle power supply to a lamp. The second type is a cheaper and smaller low power switch, actuated by the vehicle operator, which provides power from the power supply to an electromechanical relay. The low power switch can only provide enough power to the relay to actuate the relay; the relay provides substantially more power from the vehicle power supply to the lamp.

The third type of lighting control module is electronic. The electronic lighting control module receives user input and/or input from sensors (e.g., ambient light sensors) and other sources to determine when to light a lamp. When the electronic lighting control module determines that a lamp should be lit (e.g., the vehicle engine is running, the transmission is in drive, and there is little ambient light), it either provides power directly to the ballast or energizes an electromechanical relay which provides power from the vehicle power supply to the lamp ballast. Thus, the electronic lighting control module can be built into an existing electrical component of the vehicle such as an electronic control module. However, the electronic lighting control module must either be designed with the capacity to provide a relatively high source current required to power the ballast directly or must utilize an electromechanical relay to provide power to the ballast. Either solution (high current electronic lighting control module or the addition of an electromechanical relay), adds a cost to the vehicle lighting system.

FIG. 1 shows an example of a vehicle lighting using a vehicle lighting control module (e.g. a low power switch, a high power switch, or an electronic control) to control a relay which provides power to an electronic ballast as is known in the prior art. Referring to FIG. 1, a prior art electronic ballast 102 of a vehicle lighting system 100 provides power to a lamp 104 in response to receiving power from a relay 106. In this prior art system, a power supply 108 (i.e., a vehicle charging system) of a vehicle comprises a battery and an alternator for providing power to electrical systems of the vehicle, including the vehicle lighting system 100. In operation, an operator of the vehicle provides input to a vehicle lighting control module 110 (e.g., a headlight switch of the vehicle). Based on the operator provided input, the vehicle lighting control module 110 selectively energizes the relay 106. That is, the vehicle lighting control module 110 receives power from the vehicle power supply 108 and provides the received power to the relay 106 when the operator turns the headlight switch on. Conversely, the vehicle lighting control module 110 receives power from the vehicle power supply 108 but does not energize the relay 106 when the operator turns the headlight switch off.

When the vehicle lighting control module 110 energizes the relay 106, the relay 106 provides a supply voltage from the vehicle power supply 108 to an input filter 112 of the ballast 102. The input filter 112 filters noise from the supply voltage provided by the relay 106 and provides the filtered supply voltage to a bias regulator 114 and a power stage 116 of the ballast 102. The bias regulator 114 receives the filtered supply voltage and generates a first bias voltage for a controller 118 of the ballast 102, and a second bias voltage for the power stage 116 of the ballast 102. The controller 118 controls the power stage 116 to provide power to the lamp 104. Thus, the ballast 102 provides power to the lamp 104 in response to receiving a supply voltage from the power supply 108 via the relay 106.

SUMMARY

In one embodiment of the invention, a vehicle lighting system includes a lamp, a lighting control module, and a ballast having a bias control circuit. The bias control circuit energizes a bias regulator of the ballast with power from a power supply as a function of a remote enable signal provided by the lighting control module. When the bias regulator receives power from the bias control circuit, it provides a first bias voltage to a controller of the ballast. The controller controls a power stage of the ballast to provide power to the lamp from the vehicle power supply. The bias control circuit includes a first switch and resistive pathways from an input of the first switch to ground and a low side of the first switch to ground. The first switch selectively energizes a first portion of the bias regulator which generates the first bias voltage for the controller. The bias control circuit may also include a second switch and resistive pathways from an input of the second switch to ground and a low side of the second switch to ground. The second switch selectively energizes a second portion of the bias regulator which generates a second bias voltage which is provided to the power stage.

In one embodiment, the invention includes a method of selectively providing power from a power supply to a lamp as a function of a remote enable signal. A bias control circuit selectively energizes a bias regulator in response to the remote enable signal provided in an enable state. The bias regulator provides a first bias voltage and a second bias voltage when energized by the bias control circuit. The generated first bias voltage is received at a controller which controls operation of a power stage. The generated second bias voltage is received at the power stage along with a supply voltage from the power supply, and the power stage is controlled by the controller to provide power to the lamp.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 4 is a flow chart of a method for selectively providing power to a lamp from a power supply as a function of a remote enable signal according to one embodiment of the invention.

Corresponding reference characters indicate corresponding parts throughout the drawings.

DETAILED DESCRIPTION

Figure 2:
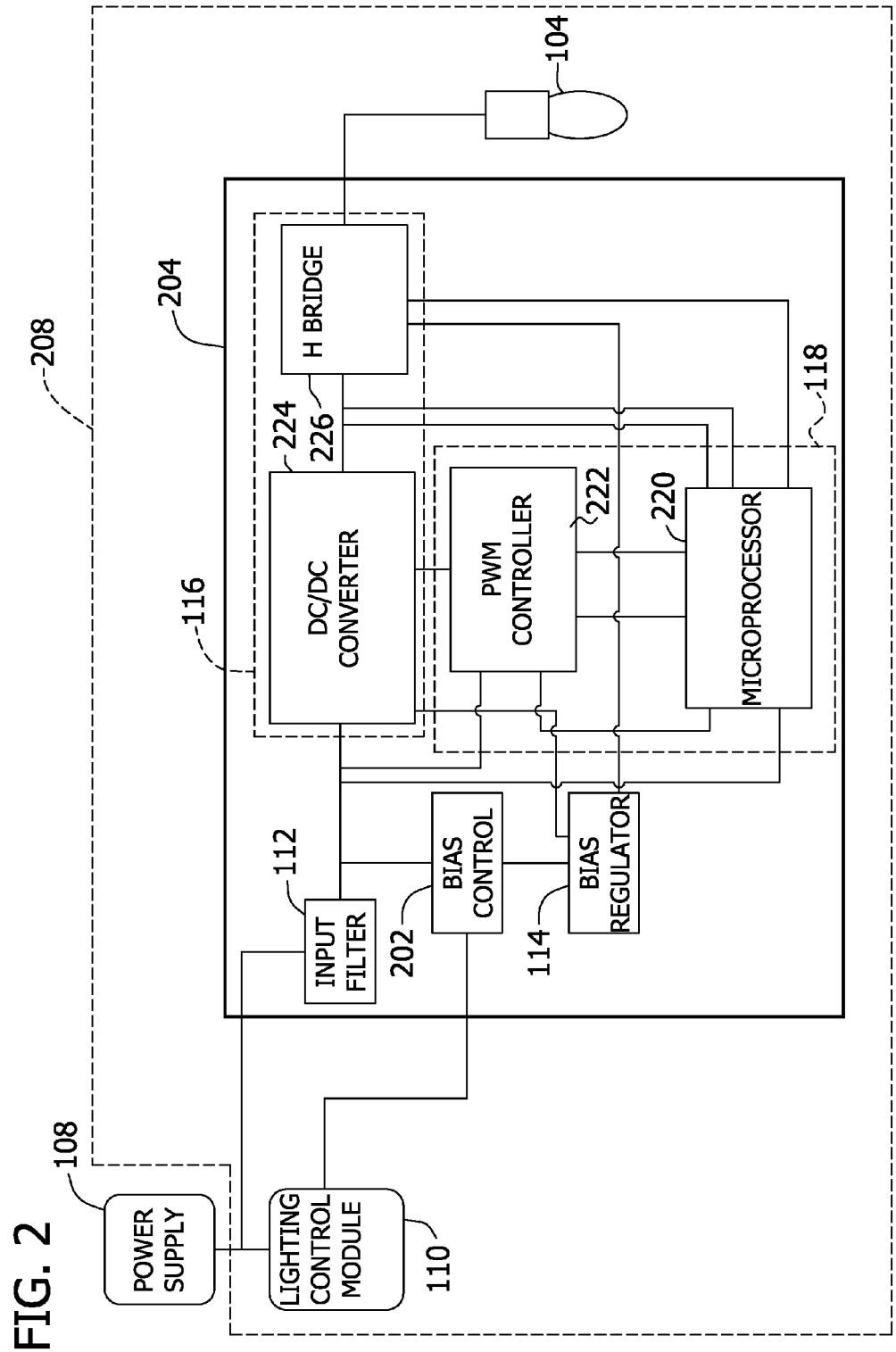
FIG. 2 is a block diagram of a vehicle lighting system configured to selectively enable a ballast receiving a supply voltage from a power supply according to one embodiment of the invention.

Referring to FIG. 2, a ballast 204 includes a bias control circuit 202 for energizing a bias regulator 114 (e.g., a bias regulator circuit) in response to receiving a remote enable signal from the lighting control module 110 according to one embodiment of the invention. A vehicle operated by an operator has a vehicle lighting system 208 including the ballast 204, a lamp 104 and the lighting control module 110. In operation, a power supply 108 provides a continuous supply voltage to the lighting control module 110 and the ballast 204. An input filter 112 of the ballast 204 receives the supply voltage provided by the power supply 108 to the ballast 204 and filters noise from the supply voltage. The input filter 112 continuously provides the filtered supply voltage to the bias control circuit 202 and a power stage 116 of the ballast 204. Thus, the input filter 112, power stage 116, and bias control circuit 202 continuously receive power from the vehicle power supply 108, independent of whether the ballast 204 is providing power to the lamp 104. In one embodiment, the supply voltage is a 9-16 volt DC voltage, and the input filter 112 comprises a capacitive and inductive network for providing power to the bias control circuit 202 and to the power stage 116.

The vehicle lighting control module 110 receives an input and provides a remote enable signal to the bias control circuit 202 of the ballast 204 as a function of the received input. The input may be a sensor signal and/or input from the operator. For example, in one embodiment, the vehicle lighting control module 110 provides the remote enable signal to the ballast 204 if a signal from an ambient light sensor indicates a low light condition, or if the operator turns a headlight switch of the vehicle to an on position. In one embodiment, the remote enable signal is a digital signal having two states and is continuously provided to the ballast 204. In an enable state, the remote enable signal is a 12 volts direct current (DC) voltage, and in a disable state, the remote enable signal is a 0 volts DC voltage. It is contemplated that in other embodiments of the invention, the enable state may be 0 volts DC while the disable state is 12 volts DC if the bias control circuit 202 is configured accordingly. Additionally, the lighting control module 110 may be a high power switch, a low power switch, or implemented in an integrated circuit.

The bias control circuit 202 energizes a bias regulator 114 (e.g., a bias regulator circuit) in response to receiving the remote enable signal from the lighting control module 110. When energized, the bias regulator 114 generates a first bias voltage and a second bias voltage from the filtered supply voltage provided by the input filter 112. The first bias voltage (e.g., 8.5 volts DC) energizes a controller 118 of the ballast, and the second bias voltage (e.g., 12 volts DC) enables the power stage 116. The controller 118 controls the power stage 116 to provide power from the power supply 108 to the lamp 104. In one embodiment, the power stage 116 supplies the lamp 104 with a square wave 500 Hertz nominal signal at about 35 watts of power, and the lamp 104 is a type D3 metal halide lamp. In another embodiment of the invention, the bias regulator 114 generates a bias voltage that energizes both the controller 118 and enables the power stage 116.

The power stage 116 comprises a DC to DC converter 224 and an H bridge 226. The DC to DC converter 224 receives the filtered supply voltage from the input filter 112 and provides a stepped up DC voltage to the H bridge 226 in accordance with a control signal from the controller 118. In operation, the DC to DC converter 224 only provides the stepped up DC voltage to the H bridge 226 when the bias regulator 114 is energized by the bias control circuit 202 (i.e., when the ballast 204 is providing power to the lamp 104). The control signal dictates the voltage of the stepped up DC voltage provided to the H Bridge 226 by the DC to DC converter 224. The H bridge 226 switches the stepped up DC voltage provided by the DC to DC converter 224 in accordance with a reference frequency provided by the controller 118. Thus, the H bridge 226 provides the lamp 104 with a relatively high voltage square wave alternating current power signal.

The controller 118 comprises a microprocessor 220 and a pulse width modulation (PWM) controller 222. The microprocessor 220 and PWM controller 222 cooperate to sense the voltage and current provided by the input filter 112 and the voltage and current of the stepped-up DC voltage provided to the H bridge 226 by the DC to DC converter 224. Based on these sensed inputs, the PWM controller 222 adjusts the control signal provided to the DC to DC converter 224 in order to adjust the voltage of the waveform supplied to the lamp 104 and the microprocessor 220 adjusts the reference frequency provided to the H bridge 226 in order to adjust the frequency of the waveform provided to the lamp 104. In steady-state operation, the waveform provided to the lamp 104 is a square wave 40-90 volt AC signal at 500 hertz nominal. One skilled in the art will recognize that the frequency and voltage of the waveform will vary in order to control the amount of power provided to the lamp 104 and to achieve striking and warm-up of the lamp 104.

Figure 3:
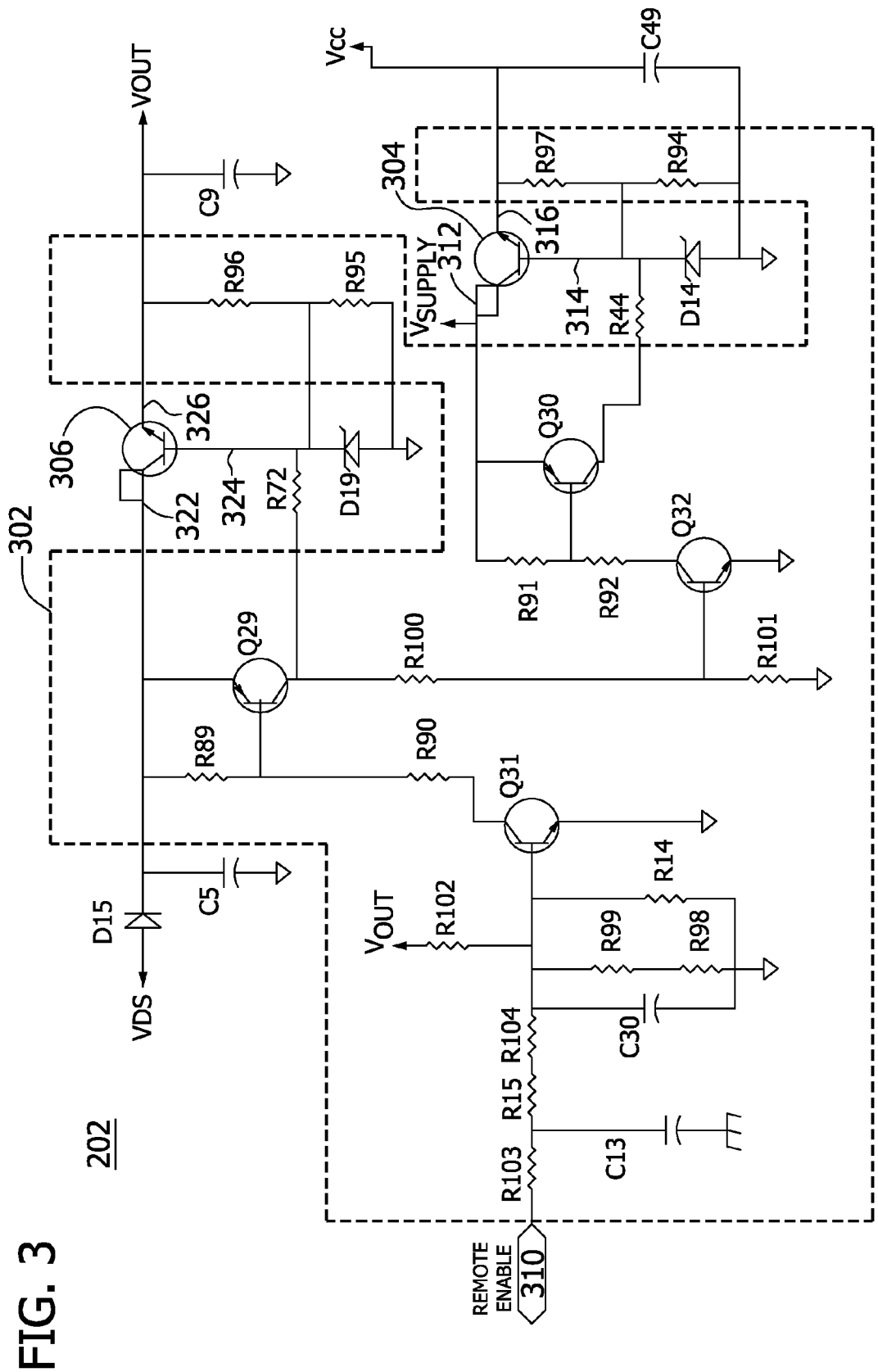
FIG. 3 is a schematic diagram of a bias control circuit of the ballast shown in FIG. 2 according to one embodiment of the invention.

Referring to FIG. 3, one embodiment of the bias control circuit 202 is shown. In the illustrated embodiment, the bias control circuit 202 receives a drain voltage $V_{DS}$ from a switching transistor of the DC to DC converter 224 in addition to the supply voltage $V_{SUPPLY}$ via the input filter 112. When the supply voltage VSUPPLY is low, diode D15 and capacitor C5 cooperate to provide a voltage higher than VSUPPLY (i.e., the drain voltage VDS) to a buffer circuit 302 of the bias control circuit 202 such that the bias control circuit 202 operates properly. The buffer circuit 302 receives the remote enable signal at jumper 310 from the lighting control module 110 and selectively enables a first switch 304 and a second switch 306. That is, when the remote enable signal is in the enable state, the buffer circuit 302 enables the first switch 304 and the second switch 306 to conduct electricity, and when the remote enable signal is in the disable state, the buffer circuit 302 disables the first switch 304 and the second switch 306 such that the first switch 304 and the second switch 306 do not conduct electricity. The first switch 304 has a high side 312 connected to the supply voltage $V_{SUPPLY}$ from the input filter 112, an input 314 connected to the buffer circuit 302, and a low side 316 connected to a first portion of the bias regulator 114 which generates the first bias voltage when receiving electricity from the first switch 304. An output from the bias control circuit 202 to the first portion of the bias regulator is shown at $V_{CC}$. The second switch 306 has a high side 322 connected to the rectified drain voltage $V_{DS}$ from the switching transistor of the DC to DC converter 224, an input 324 connected to the buffer circuit 302, and a low side 326 connected to a second portion of the bias regulator 114 which generates the second bias voltage when receiving electricity from the second switch 306. An output from the bias control circuit 202 to the second portion of the bias regulator is shown at $V_{OUT}$.

In one embodiment of the invention, the controller 118, when receiving the first bias voltage (e.g., 8.5 volts DC), provides the first bias voltage to bias voltage to the PWM controller 222 and regulates the first bias voltage down to a third voltage (e.g., 5 volts DC) for the microprocessor 220. The first bias voltage is also used by the controller 118 to drive a gate of the switching transistor of the DC to DC converter 224. The second bias voltage is provided to the H drive of the power stage. The bias control circuit 202 is also configured such that the second bias voltage (e.g., 12 volts DC) back-feeds the first bias voltage (e.g., 8.5 volts DC) when the first bias voltage droops by a predetermined amount. This may be accomplished, for example, by connecting a zener diode between the bias control circuit 202 outputs $V_{CC}$ and $V_{OUT}$ in the appropriate orientation as known by those skilled in the art.

An input resistance of the buffer circuit 302 and the voltage of the remote enable signal determine a source current capacity required of the lighting control module 110 to enable the bias control circuit 202. In the embodiment shown in FIG. 3, the total resistance of input resistors R103, R15, and R104 is 8.8 kOhms which means that the source current capacity for a 12 volt remote enable signal is less than 1.25 milliamperes. The relatively low source current requirement on the lighting control module 110 means that any type of lighting control module 110 may be used to generate the remote enable signal including a direct digital output from an integrated circuit (e.g., an electronic control module of the vehicle).

Figure 1:
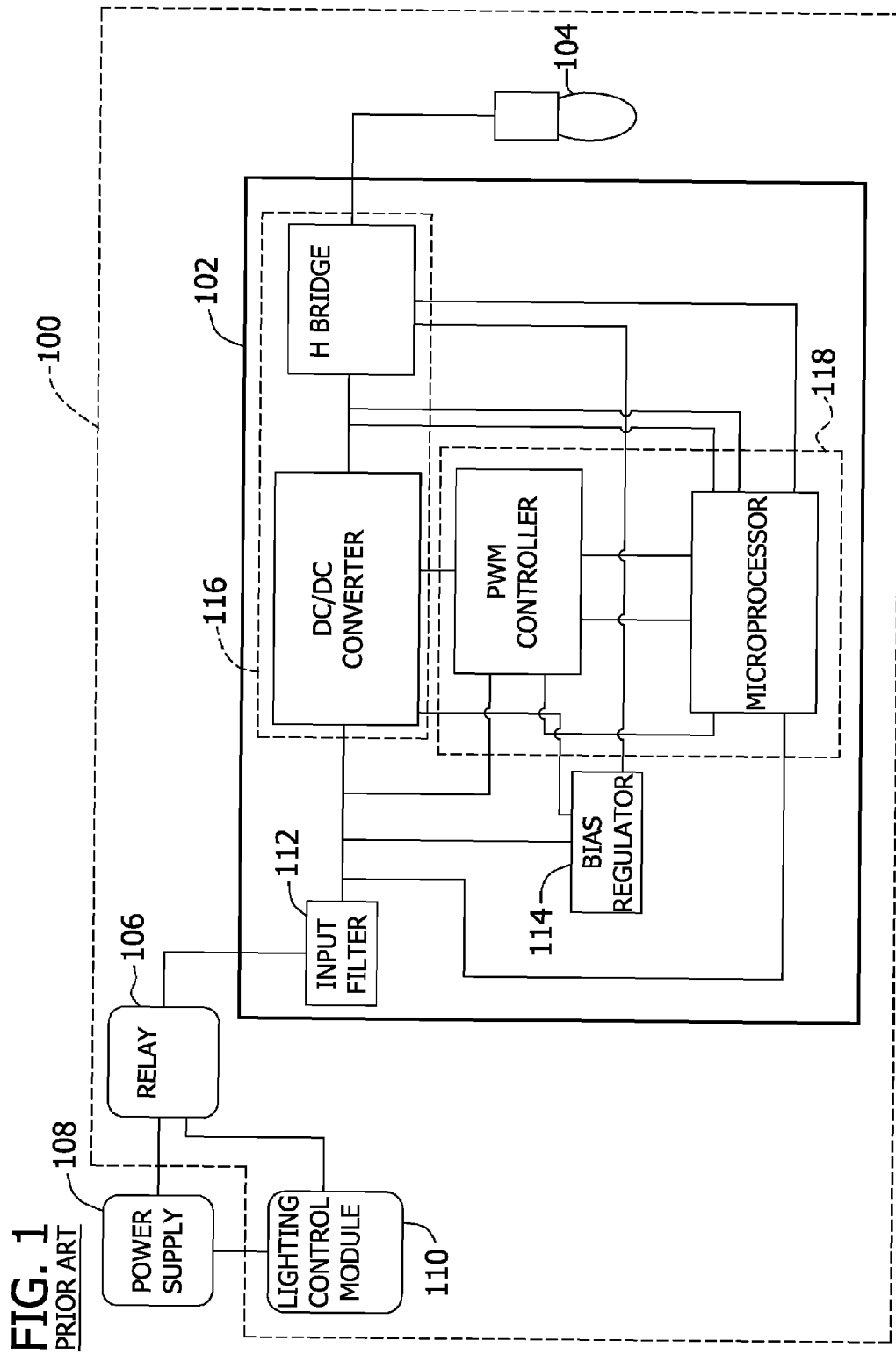
FIG. 1 is a block diagram of a vehicle lighting system configured to selectively provide power from a power supply to a ballast as known is in the PRIOR ART.

In operation, when the remote enable signal is in the disable state, the bias control circuit 202 draws a current substantially equal to zero amperes. Resistors R94 and R97 provide a resistive pathway from the low side 316 of the first switch 304 to ground and from the input 314 of the first switch 304 to ground. These resistive pathways prevent charge accumulation at the input 314 and low side 316 of the first switch 304, which prevents the first switch 304 from conducting electricity when the remote enable signal is in the disable state. Similarly, resistors R96 and R95 provide a resistive pathway from the low side 326 of the second switch 306 to ground and from the input 324 of the second switch 306 to ground. These resistive pathways prevent charge accumulation at the input 324 and low side 326 of the second switch 306, which prevents the second switch 306 from conducting electricity when the remote enable signal is in the disable state. Thus, the bias control circuit 202 draws a minimal current when the remote enable signal is in the disable state, allowing the ballast 204 to be continuously connected to the power supply 108, eliminating the need for a high power capacity device to selectively connect the ballast 204 to the power supply 108 such as relay 106 as shown in prior art FIG. 1.

In one embodiment of the invention, the first switch 304 and the second switch 306 are dual bipolar transistors, and the second portion of the bias regulator 114 is a capacitive network for reducing transients at the output $V_{OUT}$ of the second switch 306. In another embodiment of the invention, the second portion of the bias regulator 114 is an integrated circuit regulator. One skilled in the art will recognize that the first and second switches 304,306 may be any type of switch, and that the first portion and second portion of the bias regulator 114 may be any type of regulators. For example, the first and second switches may be mosFETs, and the second portion of the bias regulator 114 may be an integrated circuit regulator while the first portion of the bias regulator 114 is a capacitive network. Additionally, other embodiments of the bias control circuit 202 may receive only the supply voltage, or may receive voltages from sources within the vehicle lighting system other than the drain of the switching transistor in the DC to DC converter 224.

Referring to FIG. 4, a method for selectively providing power to a lamp from a power supply as a function of a remote enable signal is illustrated. The method starts at 402 with a power supply providing a supply voltage. At 404, a remote enable signal in an enable state is received at a bias control circuit, and at 406, the bias control circuit energizes a bias regulator. At 408, the bias regulator generates a first bias voltage and a second bias voltage. The first bias voltage is received at a controller at 410, and the second bias voltage is received at a power stage along with the supply voltage at 412. At 414, the controller controls the power stage to provide power to a lamp.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A ballast for providing power to a lamp from a power supply providing a supply voltage, said ballast responsive to a remote enable signal from a lighting control module, said ballast comprising:
   a bias regulator circuit for selectively generating a first bias voltage;
   a controller for receiving the generated first bias voltage from the bias regulator circuit;
   a power stage controlled by the controller for receiving the supply voltage from the power supply and providing power to the lamp; and
   a bias control circuit for receiving the remote enable signal and energizing the bias regulator circuit in response to the received remote enable signal, wherein said bias regulator circuit, when energized by said bias control circuit, generates the first bias voltage to energize the controller.

2. The ballast of claim 1 wherein the bias regulator circuit selectively generates a second bias voltage, wherein the power stage receives the second bias voltage from the bias regulator circuit, and wherein the bias regulator circuit, when energized by the bias control circuit, generates the second bias voltage to enable the power stage.

3. The ballast of claim 1 wherein the power stage receives the first bias voltage from the bias regulator circuit and wherein the first bias voltage enables the power stage.

4. The ballast of claim 2 wherein a voltage of the first bias voltage is equal to a voltage the second bias voltage.

5. The ballast of claim 1 wherein the remote enable signal is a digital signal having a disable state of about 0 volts and an enable state of about 12 volts wherein the ballast provides power to the lamp when the remote enable signal is in the enable state, and said ballast does not provide power to the lamp when the remote enable signal is in the disable state.

6. The ballast of claim 1 wherein when the bias regulator circuit is not energized by the bias control circuit, said bias regulator circuit draws a leakage current substantially equal to zero amperes and the ballast does not provide power to the lamp.

7. The ballast of claim 1 wherein the controller includes a microprocessor receiving the first bias voltage and wherein the first bias voltage is substantially equal to zero volts when the bias regulator circuit is not energized by the bias control circuit.

8. The ballast of claim 2 wherein the bias control circuit comprises:
   a first switch having a high side connected to the power supply, a low side connected to the bias regulator circuit, and an input for receiving the remote enable signal, said first switch selectively providing power from the power supply to a first portion of the bias regulator circuit in response to the remote enable signal, wherein said first portion of the bias regulator circuit generates the first bias voltage from the power received from the low side of the first switch; and
   a base current interrupt circuit for providing a resistive path from the low side of the first switch to a ground and from the input of the first switch to the ground.

9. The ballast of claim 8 wherein the bias control circuit further comprises:
   a second switch having a high side connected to the power supply, a low side connected to the bias regulator circuit, and an input for receiving the remote enable signal, said second switch selectively providing power from the power supply to a second portion of the bias regulator circuit in response to the remote enable signal, wherein the second portion of the bias regulator circuit generates the second bias voltage from the power received from the low side of the second switch; and
   a second base current interrupt circuit for providing a resistive path from the low side of the second switch to the ground and from the input of the second switch to the ground.

10. The ballast of claim 9 wherein:
the first switch is a first dual bipolar transistor;
the second switch is a second dual bipolar transistor;
the power supply is a vehicle charging system, said vehicle charging system comprising a battery and an alternator;
the lamp is a metal halide lamp;
the ballast receives the supply voltage from the power supply independent of a state of the remote enable signal; and
the second portion of the bias regulator circuit energized by the bias control circuit for producing the second bias voltage comprises a capacitive network.

11. A method of selectively providing power to a lamp from a power supply as a function of a remote enable signal, said power supply providing a supply voltage, said method comprising:
   selectively energizing a bias regulator circuit via a bias control circuit in response to the remote enable signal;
   generating a first bias voltage when said bias regulator circuit is energized by said bias control circuit; and
   receiving the generated first bias voltage at a controller, said controller controlling a power stage, said power stage receiving the supply voltage from the power supply and providing power to the lamp.

12. The method of claim 11 further comprising generating a second bias voltage when the bias regulator circuit is energized by the bias control circuit and wherein the power stage receives the second bias voltage from the bias regulator.

13. The method of claim 11 wherein the power stage receives the first bias voltage from the bias regulator.

14. The method of claim 12 wherein a voltage of the first bias voltage is equal to a voltage the second bias voltage.

15. The method of claim 11 wherein the remote enable signal is a digital signal having a disable state of about 0 volts and an enable state of about 12 volts wherein the power stage provides power to the lamp when the remote enable signal is in the enable state, and said power stage does not provide power to the lamp when the remote enable signal is in the disable state.

16. The method of claim 11 wherein when the bias regulator circuit is not energized by the bias control circuit, said bias regulator circuit draws a leakage current substantially equal to zero amperes and the ballast does not provide power to the lamp.

17. The method of claim 11 wherein said receiving the generated first bias voltage comprises receiving the generated first bias voltage at a microprocessor of the controller, and wherein the first bias voltage is substantially equal to zero volts when the bias regulator circuit is not energized by the bias control circuit.

18. The method of claim 11 wherein selectively energizing the bias regulator circuit comprises:
    selectively providing power from the power supply to a first portion of the bias regulator circuit in response to the remote enable signal via a first switch of the bias control circuit, said first switch having a high side connected to the power supply, a low side connected to the bias regulator circuit, and an input for receiving the remote enable signal, wherein said first portion of the bias regulator circuit generates the first bias voltage from the power provided by the low side of the switch; and
    providing a resistive path from the low side of the first switch to a ground and from the input of the first switch to the ground via a first base current interrupt circuit.

19. The method of claim 18 wherein selectively energizing the bias regulator circuit further comprises:
    selectively providing power from the power supply to a second portion of the bias regulator circuit in response to the remote enable signal via a second switch of the bias control circuit, said second switch having a high side connected to the power supply, a low side connected to the bias regulator circuit, and an input for receiving the remote enable signal, wherein the second portion of the bias regulator circuit generates the second bias voltage from the power provided by the low side of the second switch; and
    providing a second resistive path from the low side of the second switch to the ground and from the input of the second switch to the ground via a second base current interrupt circuit.

20. The method of claim 19 wherein:
    the first switch is a first dual bipolar transistor;
    the second switch is a second dual bipolar transistor;
    the power supply is a vehicle charging system, said vehicle charging system comprising a battery and an alternator;
    the lamp is a metal halide lamp;
    the bias control circuit and the power stage receive the supply voltage from the power supply independent of a state of the remote enable signal; and
    the second portion of the bias regulator circuit powered by the second switch of the bias control circuit for producing the second bias voltage comprises a capacitive network.

21. A vehicle lighting system for selectively providing light as a function of an input, said vehicle lighting system comprising:
    a lamp for providing light in response to receiving power;
    a vehicle power supply for providing a supply voltage;
    a vehicle lighting control module for receiving the input and selectively providing a remote enable signal as a function of the received input;
    a ballast for receiving the remote enable signal and the supply voltage and selectively providing power to the lamp from the vehicle power supply in response to the remote enable signal, said ballast comprising:
        a bias regulator circuit for selectively generating a first bias voltage and;
        a controller for receiving the generated first bias voltage from the bias regulator circuit;
        a power stage controlled by the controller for receiving the supply voltage from the vehicle power supply and providing power to the lamp; and
        a bias control circuit for receiving the remote enable signal and energizing the bias regulator circuit in response to the received remote enable signal, wherein said bias regulator circuit, when energized by said bias control circuit, generates the first bias voltage to energize the controller.

22. The vehicle lighting system of claim 21 wherein the bias regulator circuit selectively generates a second bias voltage, wherein the power stage receives the second bias voltage from the bias regulator circuit, and wherein the bias regulator circuit, when energized by the bias control circuit, generates the second bias voltage to enable the power stage.

23. The vehicle lighting system of claim 21 wherein the power stage receives the first bias voltage from the bias regulator circuit and wherein the first bias voltage enables the power stage.

24. The vehicle lighting system of claim 22 wherein a voltage of the first bias voltage is equal to a voltage the second bias voltage.

25. The vehicle lighting system of claim 21 wherein the input comprises operator input provided by an operator of a vehicle, said vehicle including the vehicle lighting system.

26. The vehicle lighting system of claim 21 wherein the remote enable signal is a digital signal having a disable state of about 0 volts and an enable state of about 12 volts wherein the ballast provides power to the lamp when the remote enable signal is in the enable state, and said ballast does not provide power to the lamp when the remote enable signal is in the disable state.

27. The vehicle lighting system of claim 21 wherein when the bias regulator circuit is not energized by the bias control circuit, said bias regulator circuit draws a leakage current substantially equal to zero amperes, and the ballast does not provide power to the lamp.

28. The vehicle lighting system of claim 21 wherein the controller includes a microprocessor receiving the first bias voltage and wherein the first bias voltage is substantially equal to zero volts when the bias regulator circuit is not energized by the bias control circuit.

29. The vehicle lighting system of claim 22 wherein the bias control circuit comprises:
    a first switch having a high side connected to the power supply, a low side connected to the bias regulator circuit, and an input for receiving the remote enable signal, said first switch selectively providing power from the power supply to a first portion of the bias regulator circuit in response to the remote enable signal, wherein said first portion of the bias regulator circuit generates the first bias voltage from the power received from the low side of the switch; and
    a first base current interrupt circuit for providing a resistive path from the low side of the first switch to a ground and from the input of the first switch to the ground.

30. The vehicle lighting system of claim 29 wherein the bias control circuit further comprises:
    a second switch having a high side connected to the power supply, a low side connected to the bias regulator circuit, and an input for receiving the remote enable signal, said second switch selectively providing power from the power supply to a second portion of the bias regulator circuit in response to the remote enable signal, wherein the second portion of the bias regulator circuit generates the second bias voltage from the power received from the low side of the second switch; and a second base current interrupt circuit for providing a resistive path from the low side of the second switch to the ground and from the input of the second switch to the ground.

31. The vehicle lighting system of claim 30 wherein:
the first switch is a first dual bipolar transistor;
the second switch is a second dual bipolar transistor;
the vehicle power supply comprises a battery and an alternator;
the lamp is a metal halide lamp;
the ballast receives the supply voltage from the power supply independent of a state of the remote enable signal; and
the second portion of the bias regulator circuit energized by the bias control circuit for producing the second bias voltage comprises a capacitive network.

* * * * *